United States Patent
Cardente et al.

(10) Patent No.: US 12,072,906 B2
(45) Date of Patent: Aug. 27, 2024

(54) DATA STORAGE TRANSFORMATION SYSTEM

(71) Applicant: Dell Products L.P., Round Rock, TX (US)

(72) Inventors: John Cardente, Milford, MA (US); Gaurav Chawla, Austin, TX (US); John Harwood, Boston, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/078,131

(22) Filed: Dec. 9, 2022

(65) Prior Publication Data

US 2024/0193177 A1    Jun. 13, 2024

(51) Int. Cl.
*G06F 7/00* (2006.01)
*G06F 16/25* (2019.01)

(52) U.S. Cl.
CPC .................. *G06F 16/258* (2019.01)

(58) Field of Classification Search
CPC .. G06F 16/258; G06F 16/116; G06F 16/1794; G06F 16/2386
See application file for complete search history.

(56) References Cited

U.S. PATENT DOCUMENTS

| | | | |
|---|---|---|---|
| 9,407,942 B2 | 8/2016 | Brenneman | |
| 10,783,998 B1* | 9/2020 | Perlin | G16H 15/00 |
| 10,970,635 B1* | 4/2021 | Perlin | G16H 50/30 |
| 11,627,367 B2* | 4/2023 | Tsukagoshi | H04N 21/8451 725/85 |
| 11,847,406 B1* | 12/2023 | Mallya Kasaragod | G06N 20/00 |
| 2002/0003829 A1* | 1/2002 | Fujioka | H01S 3/03 372/55 |
| 2002/0107737 A1* | 8/2002 | Kaneko | G06Q 30/0277 705/14.68 |
| 2006/0271939 A1* | 11/2006 | Joris | G06Q 10/00 719/313 |
| 2009/0222313 A1* | 9/2009 | Kannan | G06N 7/01 707/999.005 |
| 2012/0313953 A1* | 12/2012 | Owen | G06F 40/18 345/581 |
| 2014/0156806 A1* | 6/2014 | Karpistsenko | H04L 67/2885 709/219 |
| 2016/0210354 A1* | 7/2016 | Wijnen | G06F 16/313 |
| 2017/0200090 A1* | 7/2017 | Hershey | G06N 20/00 |
| 2018/0239615 A1* | 8/2018 | Ravid | G06F 9/4494 |
| 2019/0050384 A1* | 2/2019 | Freundlich | G06F 3/0482 |
| 2019/0384849 A1* | 12/2019 | Sundararaman | G16H 30/20 |
| 2020/0075165 A1* | 3/2020 | Lieberman | G06N 3/047 |

(Continued)

*Primary Examiner* — Mohammed R Uddin
(74) *Attorney, Agent, or Firm* — Joseph Mencher

(57) ABSTRACT

A data storage transformation system includes a data storage management device that is coupled to a data provisioning device and a storage system. The data storage management device receives first format data that includes a first data format from the data provisioning device, and predicts at least one processing operation that will be performed on the first format data. The data storage management device then determines a second data format for performing the at least one processing operation, and transforms the first format data to second format data that includes the second data format. The data storage management device then transmits the second format data for storage in the storage system.

20 Claims, 10 Drawing Sheets

(56) References Cited

U.S. PATENT DOCUMENTS

| | | | |
|---|---|---|---|
| 2021/0192792 A1* | 6/2021 | Baick | G06T 7/11 |
| 2023/0297810 A1* | 9/2023 | Khinvasara | G06N 3/08 |
| | | | 706/16 |
| 2023/0397578 A1* | 12/2023 | Khare | A01K 11/006 |
| 2023/0403190 A1* | 12/2023 | Tang | H04W 24/04 |

* cited by examiner

DATA STORAGE TRANSFORMATION SYSTEM

BACKGROUND

The present disclosure relates generally to information handling systems, and more particularly to the transformation of data used by information handling systems for storage in a storage system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, desktop computing devices, laptop/notebook computing devices, tablet computing devices, mobile phones, and/or other computing devices known in the art, often require the storage of their data in storage systems for further processing of that data. For example, conventional data storage systems may receive data from computing devices like those discussed above and store that data in common file-based storage subsystems, with that data later retrieved from the conventional data storage systems by compute systems for processing. Such conventional data storage systems often store received data in storage subsystems that are relatively close to where the data was received (e.g., to minimize the time associated with that storage operation), in storage subsystems with the most free storage capacity, and/or in storage subsystems based on the cost of those storage subsystems. As will be appreciated by one of skill in the art in possession of the present disclosure, such conventional data storage systems operate relatively well for structured data that is processed by x86 processor compute systems. However, the data storage industry is evolving from structured data to semi-structured data and unstructured data that may be received from any variety of data sources and data source types, and that may include both data and associated metadata that is not optimally stored using the common filed-based storage systems discussed above.

Furthermore, as "silicon diversity" continues to grow, the data stored in conventional data storage systems may be processed using a variety of different types of compute systems (e.g., compute systems with Field Programmable Gate Array (FPGA) processing systems, Graphics Processing Unit (GPU) processing systems, Data Processing Unit (DPU) processing systems, Network Interface Controller (NIC) processing systems or other packet processors, Central Processing Unit (CPU) processing systems, etc.). In many situations, the storage of data on the common file-based storage subsystems in conventional data storage systems discussed above is often no longer optimal, as it often requires a subsequent transfer of the data in order to allow the compute system to process that data. Further still, data stored in conventional data storage systems may include any of a variety of distinct data types, and its processing by the compute systems discussed above often requires a data transformation to be performed on that data as part of the processing in order to configure that data for further processing by the compute system, thus extending the time needed to process that data.

Accordingly, it would be desirable to provide a data storage management system that addresses the issues discussed above.

SUMMARY

An Information Handling System (IHS) includes a processing system; and a memory system that is coupled to the processing system and that includes instructions that, when executed by the processing system, cause the processing system to provide a data storage management engine that is configured to: receive, from the data provisioning device, first format data that includes a first data format; predict at least one processing operation that will be performed on the first format data; determine a second data format for performing the at least one processing operation; transform the first format data to second format data that includes the second data format; and transmit the second format data for storage in the storage system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
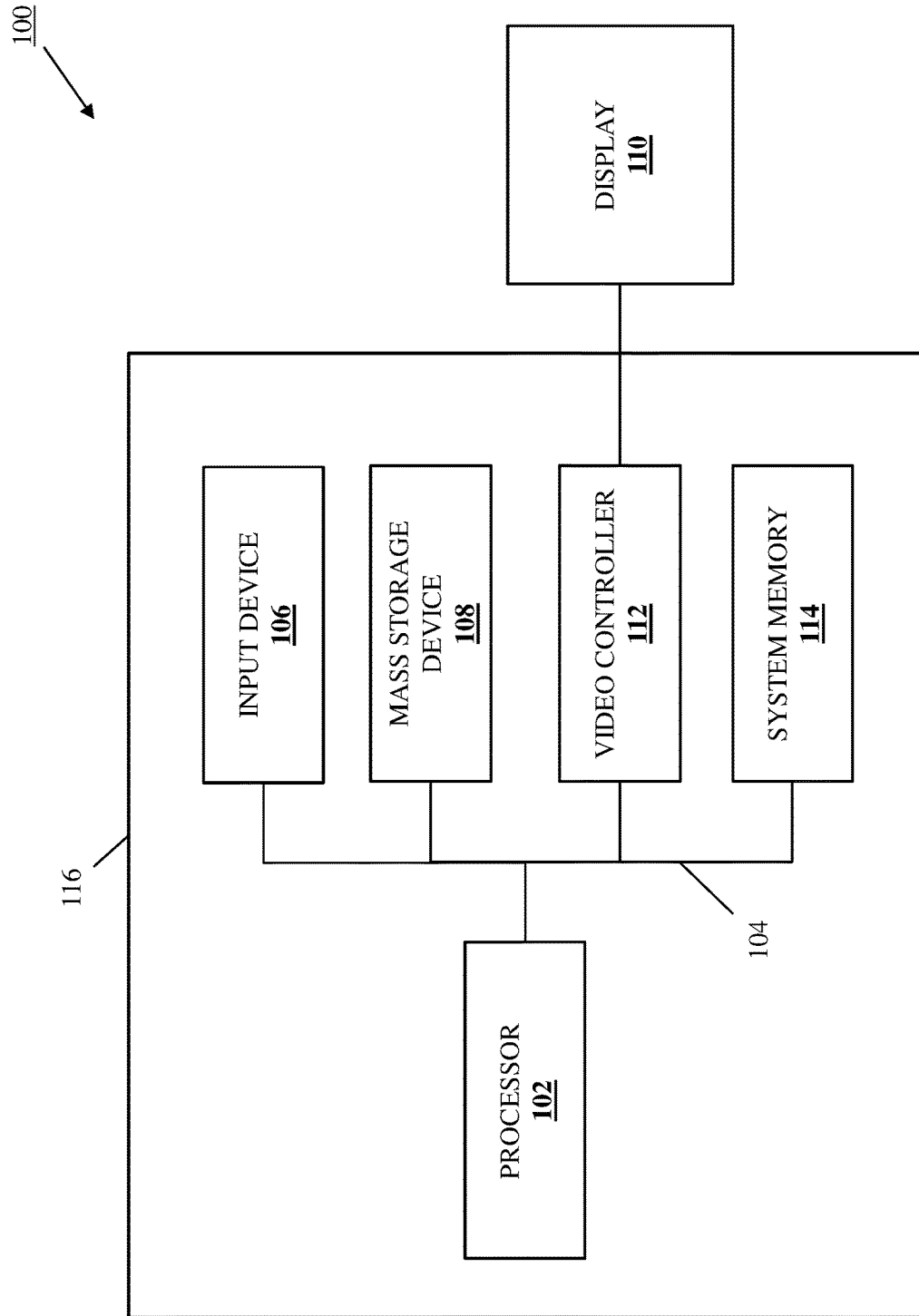
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
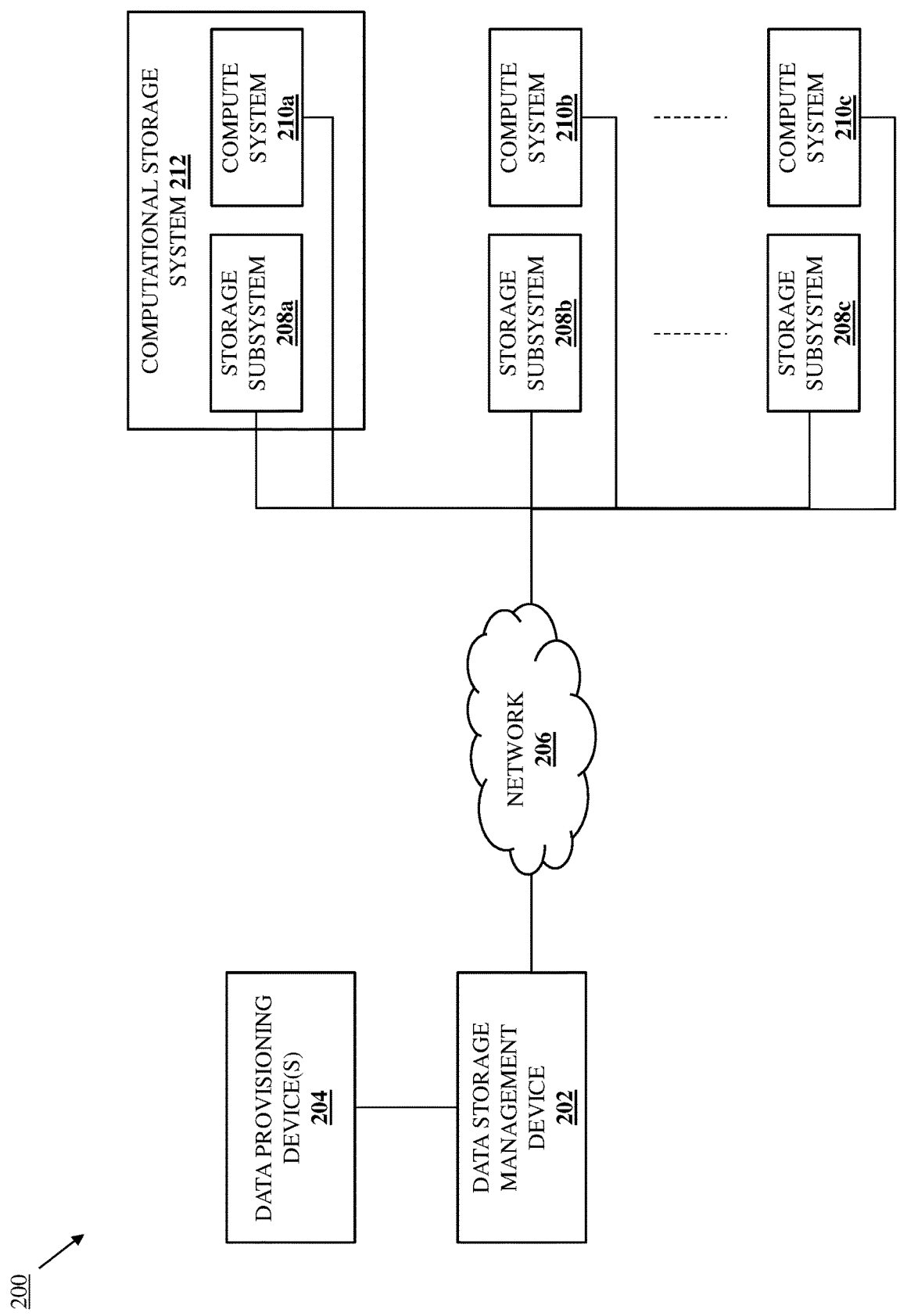
FIG. 2 is a schematic view illustrating an embodiment of a networked system that may provide the data storage transformation system of the present disclosure.

Referring now to FIG. 2, an embodiment of a networked system 200 is illustrated that may include the data storage transformation system of the present disclosure. In the illustrated embodiment, the networked system 200 includes a data storage management device 202 that may operate to perform the data storage transformation functionality described below. In an embodiment, the data storage management device 202 may be provided by the IHS 100 discussed above with reference to FIG. 1, and/or may include some or all of the components of the IHS 100, and in specific examples may be provided by a server device. However, while illustrated and discussed as being provided by a server device, one of skill in the art in possession of the present disclosure will recognize that data storage management devices provided in the networked system 200 may include any devices that may be configured to operate similarly as the data storage management device 202 discussed below.

In the illustrated embodiment, the networked system 200 includes one or more data provisioning devices 204 that are coupled to the data storage management device 202, and while the data provisioning device(s) 204 are illustrated as being directly coupled to the data storage management device 202, one of skill in the art in possession of the present disclosure will appreciate how the data provisioning device(s) 204 may be coupled to the data storage management device 202 via a network (e.g., a Local Area Network, the Internet, combinations thereof, and/or other networks known in the art) while remaining within the scope of the present disclosure as well. In an embodiment, the data provisioning device(s) 204 may be provided by the IHS 100 discussed above with reference to FIG. 1, and/or may include some or all of the components of the IHS 100, and in specific examples may be provided by server devices, desktop computing devices, laptop/notebook computing devices, tablet computing devices, mobile phones, and/or other computing devices that one of skill in the art in possession of the present disclosure would appreciate are configured to provide the data discussed below. However, while illustrated and discussed as being provided by particular computing devices, one of skill in the art in possession of the present disclosure will recognize that data provisioning devices provided in the networked system 200 may include any devices that may be configured to operate similarly as the data provisioning device(s) 204 discussed below.

In the illustrated embodiment, the data storage management device 202 is coupled to a network 206 that in the examples below includes a storage fabric, but that may also include a LAN, the Internet, combinations thereof, and/or any of a variety of networks that one of skill in the art in possession of the present disclosure will recognize as allowing the functionality described below. The data storage management device 202 is coupled via the network 206 to a storage system that, in the examples illustrated and discussed below, is provided by a storage subsystem 208a, a storage subsystem 208b, and up to a storage subsystem 208c. As described below, the storage subsystems 208a-208c that provide the storage system may be provided by different types of storage subsystems that may include file-based storage subsystems, object-based storage subsystems, block-based storage subsystems, database storage subsystems, stream-based messaging storage subsystems, and/or other types of storage subsystems that would be apparent to one of skill in the art in possession of the present disclosure.

The data storage management device 202 is also coupled via the network 206 to a plurality of compute systems 210a. 210b, and up to 210c. In an embodiment, any or all of the compute systems 210a-210c may be provided by the IHS 100 discussed above with reference to FIG. 1, and/or may include some or all of the components of the IHS 100, and in specific examples may be provided (or included in) server devices. However, while illustrated and discussed as being provided by (or included in) server devices, one of skill in the art in possession of the present disclosure will recognize that compute systems provided in the networked system 200 may include any devices that may be configured to operate similarly as the compute systems 210a-210c discussed below. As described below, the compute systems 210a-210c may include or be provided by different types of processing systems such as, for example, Central Processing Unit (CPU) processing systems, Graphics Processing Unit (GPU) processing systems, Field Programmable Gate Array (FPGA) processing systems, Data Processing Unit (DPU) processing systems, Network Interface Controller (NIC) processing systems or other packet processors, Application Specific Integrated Circuit (ASIC) processing systems, other hardware accelerator processing systems, and/or other types of processing systems that would be apparent to one of skill in the art in possession of the present disclosure would appreciate may be utilized by compute systems.

As described in further detail below, any of the storage subsystems 208a-208c may be "proximate" to any of the compute systems 210a-210c based on, for example, the processing of data stored in that storage subsystem by its proximate compute system being relatively more efficient than the processing of that data stored in that storage subsystem by the other compute systems due to, for example, that proximity resulting in relatively faster access to that data that in turn allows relatively faster processing of that data and/or faster transfers of that data over a network (e.g., with a time needed to access data measured in terms of the time required to receive the first byte of data, the last byte of data, and/or using other data access time measurement techniques that one of skill in the art in possession of the present disclosure would recognize as taking into account data access delays cause by the number of network segments traversed, network bandwidth, network physical media, network protocols, network contention, network reliability, and/or other data access delays known in the art), and/or based on any other storage subsystem/compute system proximity factors that would be apparent to one of skill in the art in possession of the present disclosure.

In a specific example, "proximity" between a storage subsystem and a computer system may be defined in terms of network latency that may be measured based on "hops", network fabric type, and/or using other latency metrics that would be apparent to one of skill in the art in possession of the present disclosure. For example, the number of hops in a topology between a storage subsystem and a compute system may be limited to a threshold number of hops in order to be "proximate". In another example, "proximity" may be defined by the enablement of relatively higher performance networking between a storage subsystem and a compute system, with the storage subsystem or other "data landing zone" transformed in some embodiments into a memory space to enable memory-to-memory data transfers for peer-to-peer communications (while eliminating an external network).

In the examples illustrated and described below, the storage subsystem 208a is provided proximate the compute system 210a in a computational storage system 212, the storage subsystem 208b is provided proximate the compute system 210b, and the storage subsystem 208c is provided proximate the compute system 210c. However, while a specific networked system 200 has been illustrated and described, one of skill in the art in possession of the present disclosure will appreciate how the networked system 200 may include a variety of other components and/or component configurations while remaining within the scope of the present disclosure as well.

Figure 3:
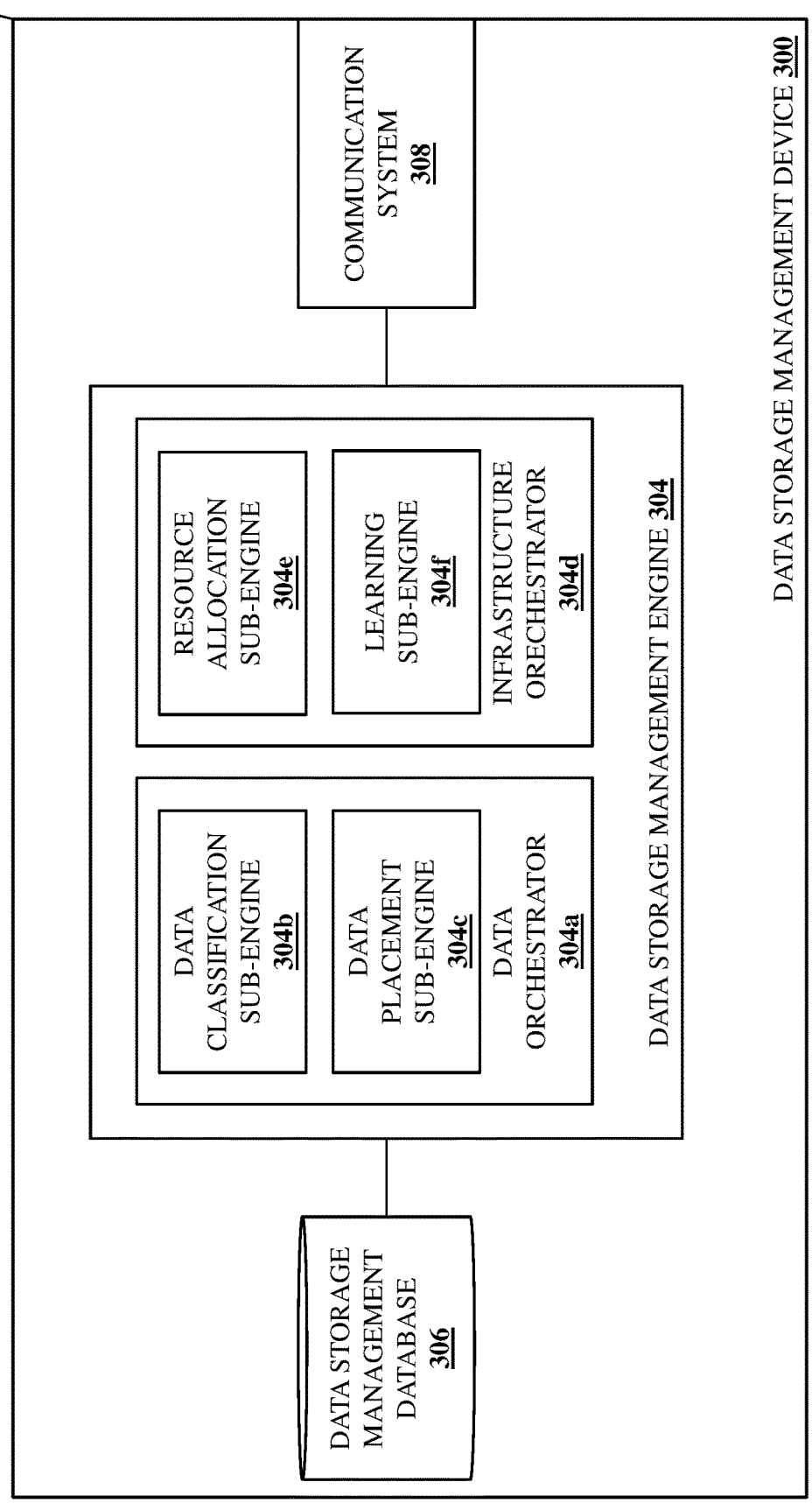
FIG. 3 is a schematic view illustrating an embodiment of a data storage management device that may be included in the networked system of FIG. 2.

Referring now to FIG. 3, an embodiment of a data storage management device 300 is illustrated that may provide the data storage management device 202 discussed above with reference to FIG. 2. As such, the data storage management device 300 may be provided by the IHS 100 discussed above with reference to FIG. 1 and/or may include some or all of the components of the IHS 100, and in specific examples may be provided by a server device. Furthermore, while illustrated and discussed as being provided by a server device, one of skill in the art in possession of the present disclosure will recognize that the functionality of the data storage management device 300 discussed below may be provided by other devices that are configured to operate similarly as the data storage management device 300 discussed below. In the illustrated embodiment, the data storage management device 300 includes a chassis 302 that houses the components of the data storage management device 300, only some of which are illustrated and discussed below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a data storage management engine 304 that is configured to perform the functionality of the data storage management engines and/or data storage management devices discussed below.

In the examples illustrated and described below, the memory system includes instructions that, when executed by the processing system, cause the processing system to provide a data orchestrator 304a in the data storage management engine 304 that includes a data classification sub-engine 304b that is configured to perform the functionality of the data classification sub-engines, data storage management engines and/or data storage management device devices discussed below, as well as a data placement sub-engine 304c that is configured to perform the functionality of the data placement sub-engines, data storage management engines and/or data storage management device devices discussed below. In the examples illustrated and described below, the memory system also includes instructions that, when executed by the processing system, cause the processing system to provide an infrastructure orchestrator 304d in the data storage management engine 304 that includes a resource allocation sub-engine 304e that is configured to perform the functionality of the resource allocation sub-engines, data storage management engines and/or data storage management devices discussed below, as well as a learning sub-engine 304f that is configured to perform the functionality of the learning sub-engines, data storage management engines and/or data storage management device devices discussed below. However, while a specific data storage management engine 304 is illustrated and described, one of skill in the art in possession of the present disclosure will appreciate how the functionality of the data storage management engine may be provided in a variety of manners that will fall within the scope of the present disclosure as well.

The chassis 302 may also house a storage system (not illustrated, but which may include the storage 108 discussed above with reference to FIG. 1) that is coupled to the data storage management engine 304 (e.g., via a coupling between the storage system and the processing system) and that includes a data storage management database 306 that is configured to store any of the information utilized by the data storage management engine 304 discussed below. The chassis 302 may also house a communication system 308 that is coupled to the data storage management engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific data storage management device 300 has been illustrated and described, one of skill in the art in possession of the present disclosure will recognize that data storage management devices (or other devices operating according to the teachings of the present disclosure in a manner similar to that described below for the data storage management device 300) may include a variety of components and/or component configurations for providing conventional functionality, as well as the functionality discussed below, while remaining within the scope of the present disclosure as well.

Figure 4:
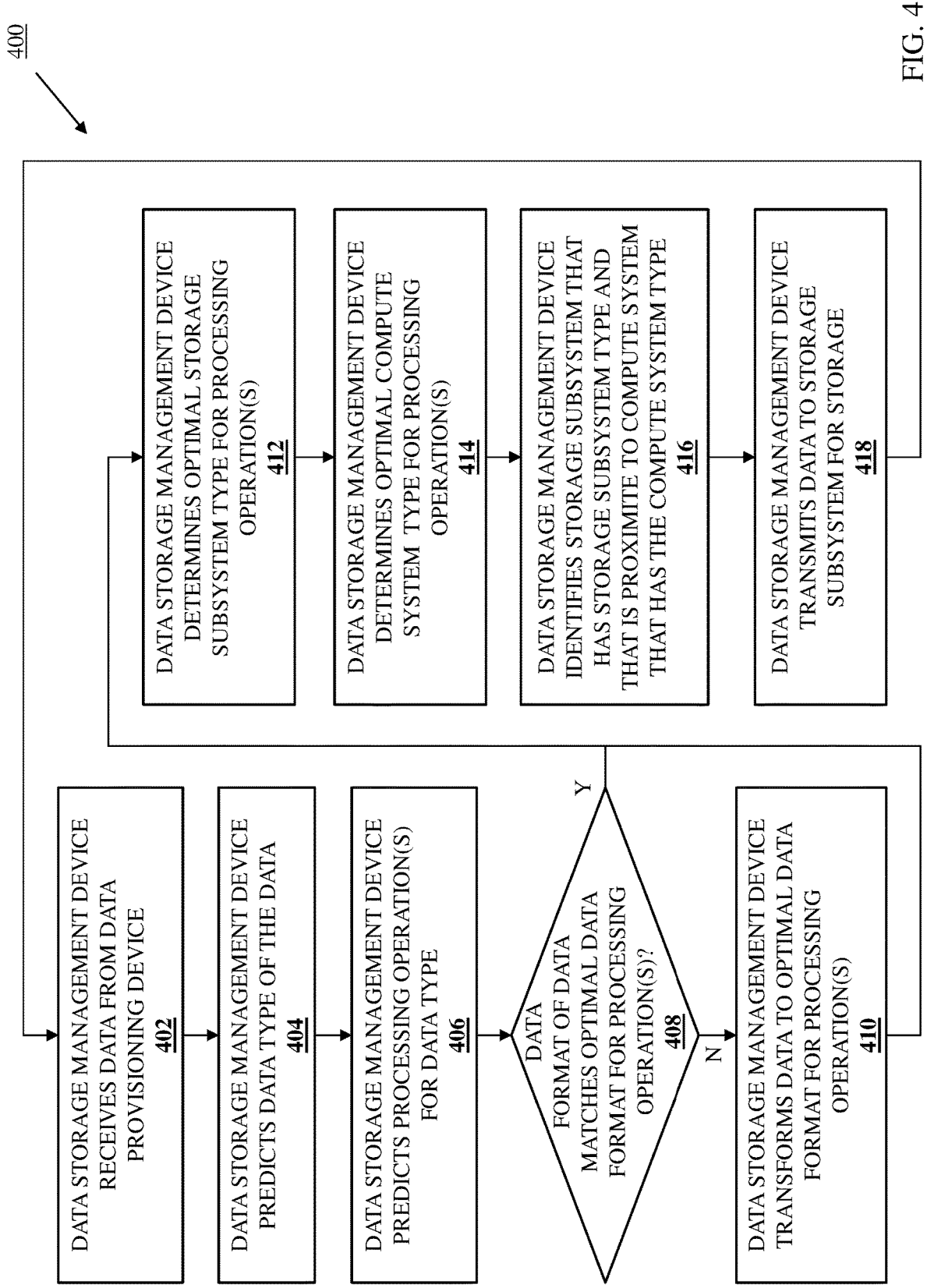
FIG. 4 is a flow chart illustrating an embodiment of a method for transforming data for storage.

Referring now to FIG. 4, an embodiment of a method 400 for transforming data for storage is illustrated. As discussed below, the systems and methods of the present disclosure determine a second data format for performing processing operation(s) on first format data that has a first data format and that is provided for storage, and then transform the first format data to second format data that includes the second data format before storing the data on a storage system. For example, the data storage placement system may include a data storage management device that is coupled to a data provisioning device and a storage system. The data storage management device receives first format data that includes a first data format from the data provisioning device, and predicts at least one processing operation that will be performed on the first format data. The data storage management device then determines a second data format for performing the at least one processing operation, and transforms the first format data to second format data that includes the second data format. The data storage management device then transmits the second format data for storage in the storage system. As such, data provided for storage in a storage system may be transformed to a data format for performing processing operations on that data prior to storing that data, eliminating the need to transform that data as part of the processing operations.

Figure 5A:
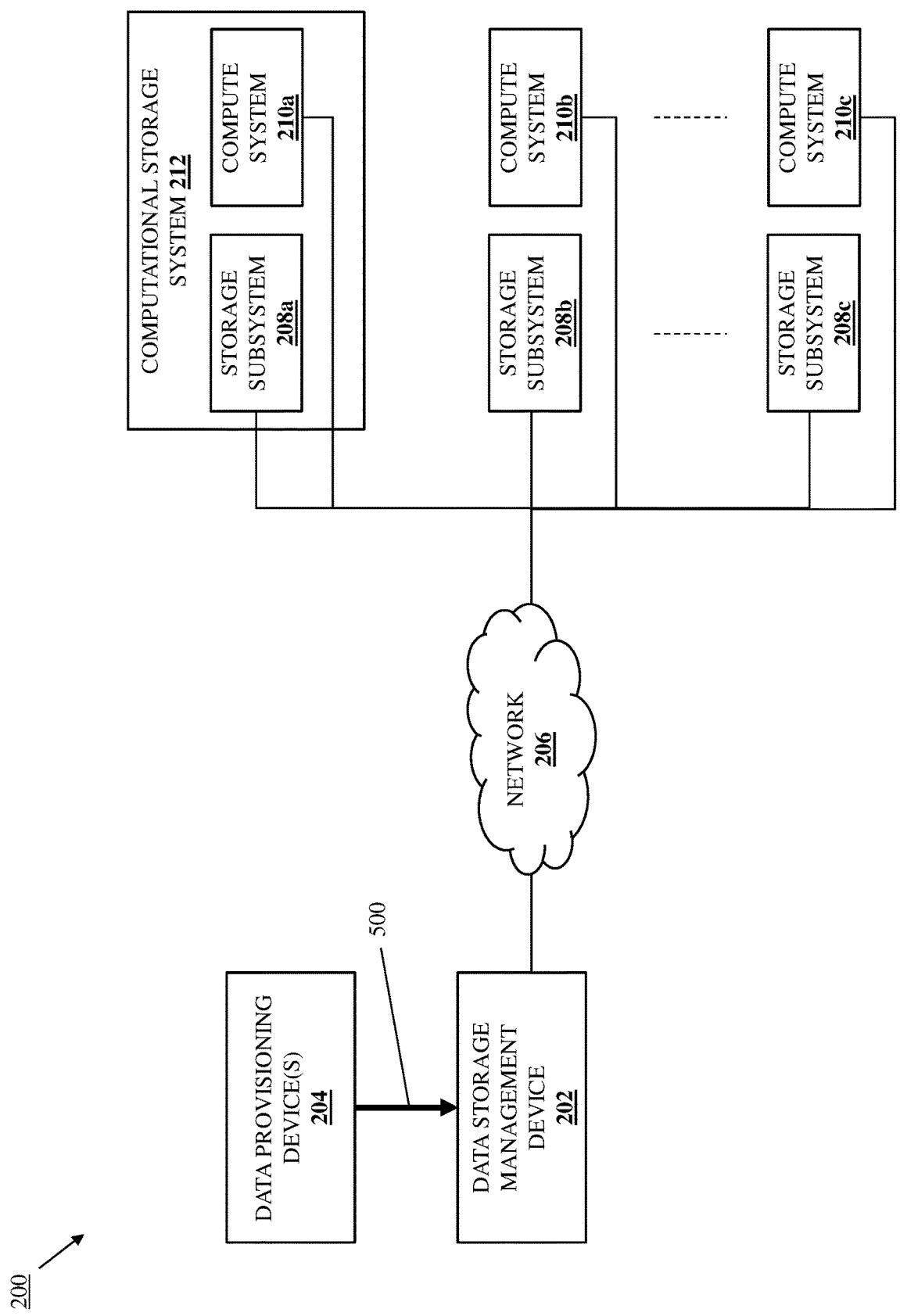
FIG. 5A is a schematic view illustrating an embodiment of the networked system of FIG. 2 operating during the method of FIG. 4.
Figure 5B:
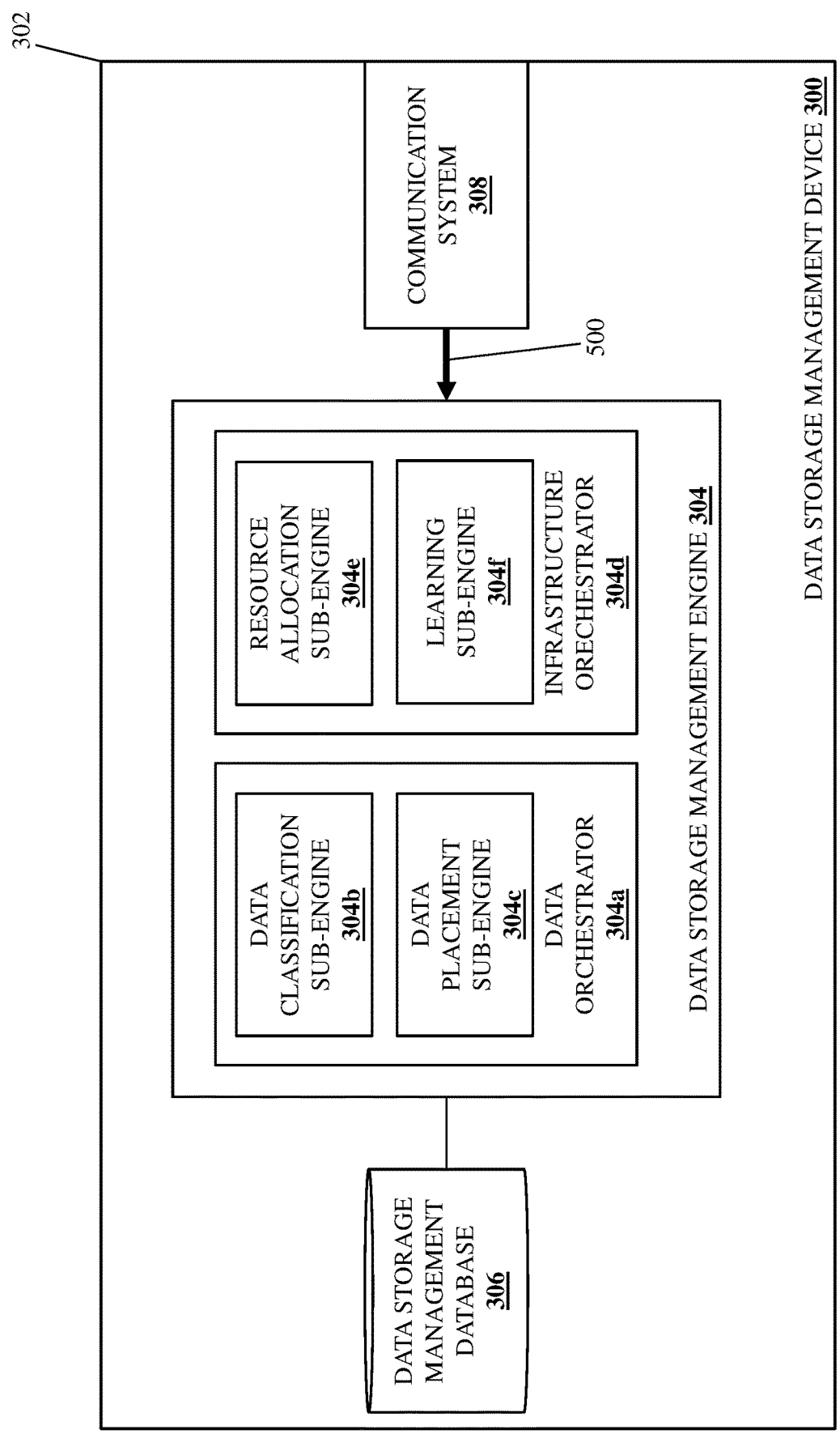
FIG. 5B is a schematic view illustrating an embodiment of the data storage management device of FIG. 3 operating during the method of FIG. 4.

The method 400 begins at block 402 where a data storage management device receives data from a data provisioning device. With reference to FIGS. 5A and 5B, in an embodiment of block 402, any of the data provisioning device(s) 204 may perform data transmission operations 500 that may include transmitting data that is included in a dataset and that is part of a data stream to the data management device 202, with the data storage management engine 304 in the data storage management device 202/300 receiving that data via its communication system 308. As discussed below, the data received at block 402 may be considered "first format data" that includes a first data format such as, for example, the industry-standard APACHE® Parquet data format, the APACHE® Avro data format, and/or other data formats for storing structured or unstructured data, transcoding video data or image data before storing it on a storage system, and/or performing other data operations known in the art, as well as any other data formats that would be apparent to one of skill in the art in possession of the present disclosure. Furthermore, the data received at block 402 may include a data type such as, for example, a structured data type (e.g., the data may be provided in a row and column data structure), a semi-structured data type (e.g., the data may be provided in JavaScript Object Notation (JSON) files, EXCEL® files, and/or other relatively limited data structures that may include tags that describe the data), an unstructured data type (e.g., the data may be provide as audio data, video data, and/or other data with no predefined schema), and/or other data types that would be apparent to one of skill in the art in possession of the present disclosure.

Further still, in other examples, the data received at block 402 may include a data type such as, for example, a video data type (e.g., data in video files), an audio data type (e.g., data in audio files), a text data type (e.g., data in text files), an image data type (e.g., data in image files), a time-series data type (e.g., data in time-series files), and/or other data types that would be apparent to one of skill in the art in possession of the present disclosure. As will be appreciated by one of skill in the art in possession of the present disclosure, the data received at block 402 may include combinations of the data types discussed above (e.g., unstructured video files, unstructured audio files, unstructured text files, unstructured image files, structured (or semi-structured) time-series files, etc.). However, while specific examples of data having different data formats and data types has been described, one of skill in the art in possession of the present disclosure will appreciate how any data having other data characteristics will benefit from the teachings of the present disclosure and thus will fall within its scope.

The method 400 then proceeds to block 404 where the data storage management device predicts a data type for the data. In an embodiment, at block 404, the data classification sub-engine 304b in the data orchestrator 304a of the data storage management engine 304 may analyze the data received at block 402 and predict a data type of that data. As discussed above, the data received at block 402 may be included in a dataset as part of a data stream, and thus the data type may be predicted at block 404 for the dataset/data stream as well. To provide some specific examples, the data type of the data received at block 402 may be predicted to be a structured tabular format data type, an unstructured image data type, or an unstructured text data type. In an embodiment, the prediction of the data type of the data at block 404 may be performed using Artificial Intelligence and/or Machine Learning techniques that include identifying the content of the data to determine whether it is text-formatted data or binary-formatted data, to determine whether it is unstructured text or semi-structured text (e.g., JSON data, HyperText Markup Language (HTML) data, Comma Separated Value (CSV) data), to determine whether it is provided in a video data format or an image data format, and/or via other determinations known in the art, and/or using other data type prediction techniques that would be apparent to one of skill in the art in possession of the present disclosure. For example, the content of the data may be presented to a pre-trained Artificial Intelligence/Machine Learning model that is configured to predict the associated data type of that data based on previously observed data with associated classifications, with the pre-trained model configured to use any of a variety of Artificial Intelligence/Machine Learning techniques ranging from rule-based expert systems to deep-learning neural networks.

In a specific example, a data type of data may be predicted based on the method used to ingest and configure that data. For example, if a platform specifies a manifest to optimize the processing of video data, that video data may be captured via a video stream from a camera or other video device in a first data format, and that video data may be encoded/decoded for processing via a GPU to, for example, perform inference operations to yield result to direct subsequent operations via a compute system. As will be appreciated by one of skill in the art in possession of the present disclosure in the art in possession of the present disclosure, such a data pipeline allows for the labeling of the data format interchanges/conversions. For example, the use of a "smart" camera may be optimized by offloading the encoding/decoding and producing data with a data format for the GPU, or performing the inference operations locally to provide the data for processing on a CPU in the data pipeline.

In some embodiments, the data may be "tagged" with the data type predicted for the data by associating that predicted data type with the data (e.g., as metadata in a catalog) in the data storage management database 306 in the data storage management device 202/300. Furthermore, while not described herein in detail, the tags, metadata, and/or other identification of the predicted data type for data may be stored in any of the storage subsystems that are used to store that data as discussed below (e.g., via the "sharing" of the catalog discussed above between the data storage management device 202 and the storage subsystems 208a-208c). As will be appreciated by one of skill in the art in possession of the present disclosure, such tagging of data may allow other components included in or connected to the storage fabric/network 206 to identify data types of data to determine how to interact with that data (e.g., components that transmit video data out of the storage fabric/network 206 subsequent to its processing discussed below may use such tags to identity such video data for transmission).

The method 400 then proceeds to block 406 where the data storage management device predicts one or more processing operations for the data type. In an embodiment, at block 406, the data classification sub-engine 304b in the data orchestrator 304a of the data storage management engine 304 may identify the predicted data type for the data to the data placement sub-engine 304b in the data orchestrator 304a of the data storage management engine 304. The data placement sub-engine 304b may then transmit a request to predict processing operations for the predicted data type to the resource allocation sub-engine 304e in the infrastructure orchestrator 304d of the data storage management engine 304. The resource allocation sub-engine 304c may then communicate with the learning sub-engine 304f in the infrastructure orchestrator 304d of the data storage management engine 304 to predict one or more processing operations that will be performed on that data type, and may identify those processing operation(s) to the data placement sub-engine 304c. In an embodiment, the prediction of the processing operation(s) for the data type may utilize Artificial Intelligence and/or Machine Learning techniques and may be based on a history of processing operations (e.g., performed as part of previous workloads) that were performed on data that had the same data type as the data type for predicted for the data at block 404.

As will be appreciated by one of skill in the art in possession of the present disclosure, the processing operation(s) that will be performed on data may vary based on the data type for that data, and the prediction of the data type of data may allow for the prediction of the most likely processing operation(s) that will be performed on that data due to those processing operation(s) having been previously performed on data having that same data type. For example, structured data may be processed using a general purpose compute system including x86 processors, image data in an image file or video data in a video file may be processed by a compute system including GPU in order to identify objects in that video data or image data, text data in a text file may be processed by a compute system including an FPGA or a GPU in order to determine the meaning of the text data, and audio data in an audio file may be processed by a compute system including an FPGA in order to perform natural language processing and covert the audio data to text data.

One of skill in the art in possession of the present disclosure will appreciate how the data pipeline created and optimized based on the available resources, locality, and data as discussed above may be utilized to predict the processing operations that will be performed on the predicted data type. However, while a specific example of data processing operation prediction has been described, one of skill in the art in possession of the present disclosure will appreciate how other data processing operation prediction techniques will fall within the scope of the present disclosure as well.

The method 400 then proceeds to decision block 408 where it is determined whether a data format of the data matches an optimal data format for the processing operation(s). In an embodiment, at decision block 408, the data placement sub-engine 304b in the data orchestrator 304a of the data storage management engine 304 may transmit a request to predict an optimal data format for the predicted processing operation(s) to the resource allocation sub-engine 304c in the infrastructure orchestrator 304d of the data storage management engine 304. The resource allocation sub-engine 304c may then communicate with the learning sub-engine 304f in the infrastructure orchestrator 304d of the data storage management engine 304 to predict an optimal data format for the data upon which the predicted processing operation(s) will be performed. In an embodiment, the prediction of the optimal data format for the data may utilize Artificial Intelligence and/or Machine Learning techniques and may be based on a history of those processing operations (e.g., performed as part of previous workloads) that were performed on data having different data formats.

As will be appreciated by one of skill in the art in possession of the present disclosure, the optimal data format for the processing of data may vary based on the data type for that data, and analysis of the performance of the processing operation(s) on data having different data formats may allow for the identification of which of those data formats provided for the fastest, least processing intensive, and/or otherwise most optimal processing operations. In an embodiment, the utilization of the compute system and other fabric resources in a data pipeline may be monitored and analyzed, and those analytics may be utilized with a requested data pipeline to determine a mapping of compute systems, data, and data format conversion to provide optimal performance based on availability. To provide some specific examples, the optimal processing of structured data may include converting the structured data to an open table data format and open file data format, while the optimal processing for an image data in an image file or text data in a text file may include storing that image data or text data as an object that can may include additional metadata related to the content of that image data or text data. However, while a specific example of optimal data format prediction has been described, one of skill in the art in possession of the present disclosure will appreciate how other optimal data format prediction techniques will fall within the scope of the present disclosure as well.

As such, in an embodiment of decision block 408, the data storage management engine 304 in the data storage management device 202/300 may determine whether the data format of the data received at block 402 matches the optimal data format for the processing operations predicted at block 406. If, at decision block 408, it is determined that the data format of the data does not match the optimal data format for the processing operation(s), the method 400 proceeds to block 410 where the data storage management device transforms the data to the optimal data format for the processing operation(s). In an embodiment, at block 410 and in response to determining that the data format of the data received at block 402 does not match the optimal data format for the processing operations predicted at block 406, the data storage management engine 304 in the data storage management device 202/300 may transform the data received at block 402 from first format data having a first data format, to second format data having a second data format that is different than the first data format.

For example, data in a CSV file format may be converted to a columnar open file format such as APACHE® Parquet, or a row optimized data format such as APACHE® Avro, while text data in a text file may be converted into feature vector for processing by a machine learning algorithm. In another example, data may be converted to an APACHE® Arrow columnar-in-memory data format and/or other file formats optimized for column-based operations, as well as to data formats optimized for storage-based operations such as deduplication operations. In yet another example, data may be converted from a data stream to a column-optimized data format in order to, for example, move that data to memory for peer-to-peer data transfers in order to enable a GPU to process that data and output it to a row-based data format for storage.

If at decision block 408 it is determined that the data format of the data matches the optimal data format for the processing operation(s), or following block 410, the method 400 proceeds to block 412 where the data storage management device determines an optimal storage subsystem type based on the processing operation(s). In an embodiment, at block 412, the data placement sub-engine 304c in the data orchestrator 304a of the data storage management engine 304 may communicate with the resource allocation sub-engine 304e in the infrastructure orchestrator 304d of the data storage management engine 304 to request a determination of the optimal storage subsystem type based on the processing operation(s) predicted for the data. The resource allocation sub-engine 304e in the infrastructure orchestrator 304d of the data storage management engine 304 may then communicate with the learning sub-engine 304f in the infrastructure orchestrator 304d of the data storage management engine 304 to determine the optimal storage subsystem type based on the processing operations predicted to be performed of that data.

In an embodiment, the determination of the optimal storage subsystem type based on the predicted processing operation(s) for the data may utilize Artificial Intelligence/Machine Learning techniques based on a history of those processing operations (e.g., performed as part of previous workloads) that were performed on data stored in storage subsystems having different storage subsystem types. As such, one of skill in the art in possession of the present disclosure will appreciate how analysis performance of the processing operation(s) on different data storage subsystem types may allow for the identification of which of those storage subsystem types provided for the fastest, least processing intensive, and/or otherwise most optimal processing operations. For example, a file-based storage system may be optimal for storing video data in video files and audio data in audio files, while an object-based storage system may be optimal for storing structured and semi-structured data in open data formats (as it allows relatively easy processing by applications running on compute systems). As such, one of skill in the art in possession of the present disclosure will appreciate how the optimal storage subsystem type may be based on available resources and the current workload(s) being performed.

To provide a specific example, the optimal storage subsystem type for performing processing operation(s) on unstructured data may be an object-based storage subsystem type with an embedded query engine, which one of skill in the art in possession of the present disclosure will appreciate allows for optimized query processing of the unstructured data. To provide another specific example, the optimal storage subsystem type for performing processing operation(s) on unstructured video and/or audio files may be a file-based storage subsystem type, which one of skill in the art in possession of the present disclosure will appreciate allows for optimized video and/or audio transcoding and/or other processing of the unstructured video and/or audio files. To provide another specific example, the optimal storage subsystem type for performing processing operation(s) on unstructured image and/or text files may be an object-based storage subsystem type, which one of skill in the art in possession of the present disclosure will appreciate allows for optimized Artificial Intelligence/Machine Learning processing of the image and/or text files. However, while specific examples of optimal storage subsystem determinations have been described, one of skill in the art in possession of the present disclosure will appreciate how other optimal storage subsystem determinations (e.g., a determination that a block-based storage subsystem type is optimal for predicted processing operations) will fall within the scope of the present disclosure as well.

The method 400 then proceeds to block 414 where the data storage management device determines an optimal compute system type based on the processing operation(s). In an embodiment, at block 414, the data placement sub-engine 304c in the data orchestrator 304a of the data storage management engine 304 may communicate with the resource allocation sub-engine 304e in the infrastructure orchestrator 304d of the data storage management engine 304 to request a determination of the optimal compute system type based on the processing operation(s) predicted for the data. The resource allocation sub-engine 304c in the infrastructure orchestrator 304d of the data storage management engine 304 may then communicate with the learning sub-engine 304f in the infrastructure orchestrator 304d of the data storage management engine 304 to determine the optimal compute system type based on the processing operations predicted to be performed of that data. However, while the optimal compute system types are described as being determined by the data storage management engine 304 based on the processing operations predicted to be performed on data, one of skill in the art in possession of the present disclosure will appreciate how a user may "tag" data, datasets, and/or data streams (e.g., via metadata associated with that data or included therein) with an identifier of the optimal compute system type for processing that data while remaining within the scope of the present disclosure, and thus the determination at block 414 may be made based on that "tagging".

In an embodiment, the determination of the optimal compute system type based on the predicted processing operation(s) for the data may utilize Artificial Intelligence/Machine Learning techniques based a history of those processing operations (e.g., performed as part of previous workloads) that were performed by compute systems having different compute system types. As such, one of skill in the art in possession of the present disclosure will appreciate how performance of the processing operation(s) by compute systems having different compute system types may allow for the identification of which of those compute system types provided for the fastest, least processing intensive, and/or otherwise most optimal processing operations. For example, the processing of structured data may be performed most optimally by "traditional" compute systems including general purpose (e.g., x86) processors, while video data in video files may be processed or transformed most optimally by a compute system with an FPGA or GPU, and audio data in audio files may be processed most optimally by a compute system with a GPU. As such, one of skill in the art in possession of the present disclosure will appreciate how the optimal compute system type may be based on available resources and the current workload(s) being performed.

To provide a specific example, the optimal compute system type to perform processing operation(s) on unstructured video files may include compute systems having an FPGA processing system, the optimal compute system type to perform processing operation(s) on unstructured image files may include compute systems have a GPU processing system, the optimal compute system type to perform processing operation(s) on feature vectors may include compute systems having a GPU processing system, the optimal compute system type to perform processing operation(s) on regular expressions may include a compute system having a DPU processing system, the optimal compute system type to perform processing operation(s) on networking packet data may include compute systems having a NIC processing system or other packet processor, and the optimal compute system type to perform processing operation(s) on undetermined data may include a compute system having a CPU processing system. However, while specific examples of optimal compute system type determinations have been described, one of skill in the art in possession of the present disclosure will appreciate how other optimal compute system type determination techniques will fall within the scope of the present disclosure as well.

The method 400 then proceeds to block 416 where the data storage management device identifies a storage subsystem that has the storage subsystem type and that is proximate to the compute system that has the compute system type. In an embodiment, at block 416, the resource allocation sub-engine 304e in the infrastructure orchestrator 304d of the data storage management engine 304 may identify a storage subsystem that has the optimal storage subsystem type determined at block 412 and that is proximate a compute system that has the optimal compute system type determined at block 414. For example, the resource allocation sub-engine 304c may perform a graph analysis of a geographically-distributed resource topology (e.g., a topology that identifies a geographical distribution of the storage subsystems 208a-208c and the compute systems 210a-210c) in order to identify an optimal storage/compute resource cluster, which includes both storage subsystem(s) having the optimal storage subsystem type determined at block 412 and compute system(s) having the optimal compute system type determined at block 414, for storing and processing the data received at block 402.

The resource allocation sub-engine 304e in the infrastructure orchestrator 304d of the data storage management engine 304 may then perform a further topology analysis on the optimal resource cluster to identify at least one of the storage subsystem(s) in the optimal resource cluster having the optimal storage subsystem type that is "proximate" at least one of the compute system(s) in the optimal resource cluster having the optimal compute system type that such that those storage subsystem(s) will provide for the most optimal processing operations by those compute system(s). As will be appreciated by one of skill in the art in possession of the present disclosure, the optimal storage subsystem type and optimal compute system type determinations and the graph analysis discussed above may provide for the graphing of the topology at a resolution that enables the identification of the optimal storage subsystem(s) and compute system(s) for storing and processing the data received at block 402 based on the usage of those storage subsystem(s) and compute system(s), the capabilities of those storage subsystem(s) and compute system(s), and/or other characteristics of those storage subsystem(s) and compute system(s) that would be apparent to one of skill in the art in possession of the present disclosure.

In some embodiments, a network topology, storage fabric type, number of hops available, network use type, and/or other factors may be utilized to determine bandwidth and/or latency characteristics between storage subsystems and compute systems in order to identify which storage subsystems and compute systems are "proximate" each other. Furthermore, in the event a storage subsystem and/or compute system cannot be found that include the optimal storage subsystem type and/or the optimal compute system type, respectively, the data storage management engine 304 in the data storage management device 212/300 may generate and display an alert to a network administrator or other user to add such storage subsystem(s) and/or compute system(s) to the networked system 200.

Figure 6A:
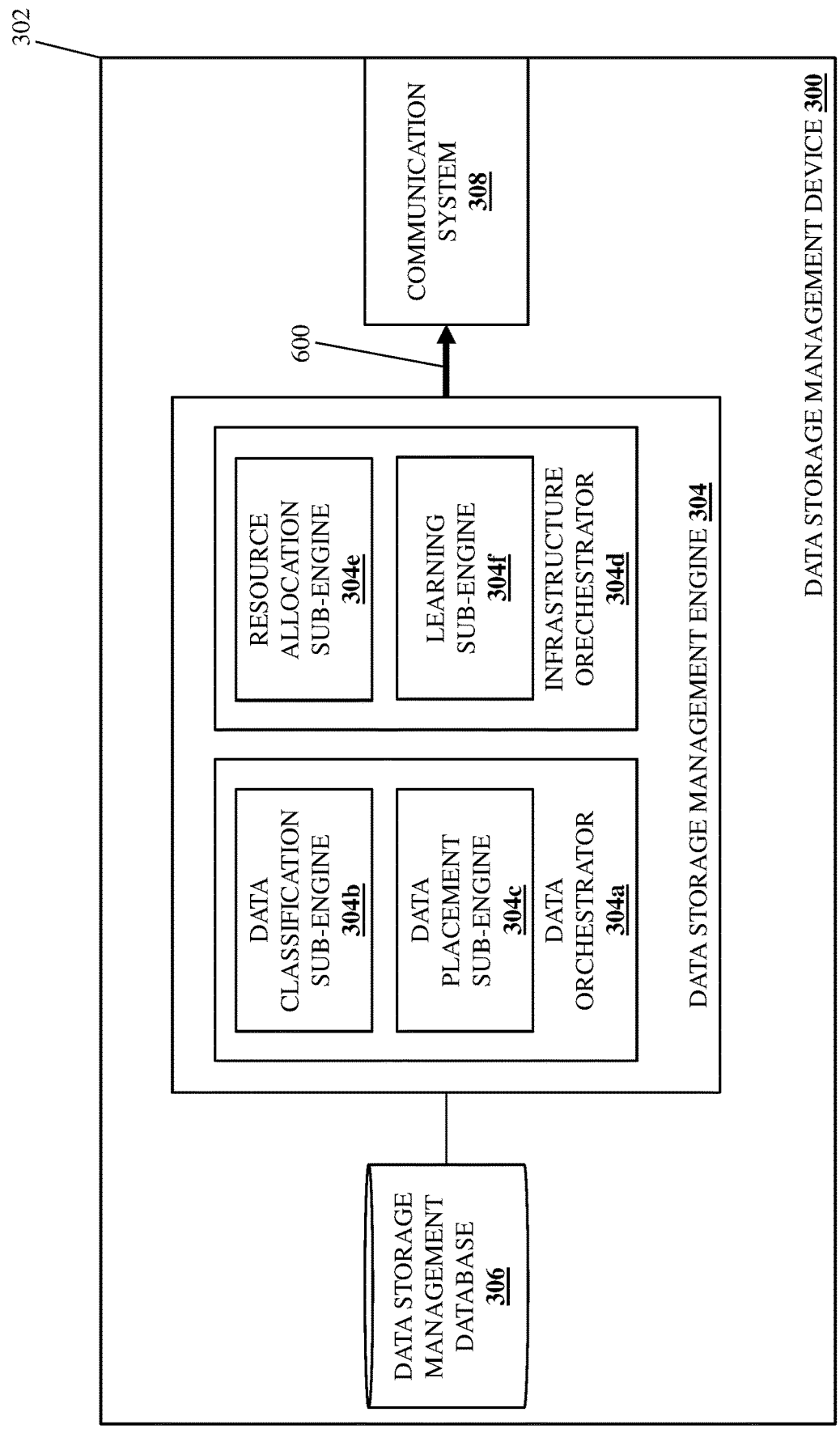
FIG. 6A is a schematic view illustrating an embodiment of the data storage management device of FIG. 3 operating during the method of FIG. 4.
Figure 6B:
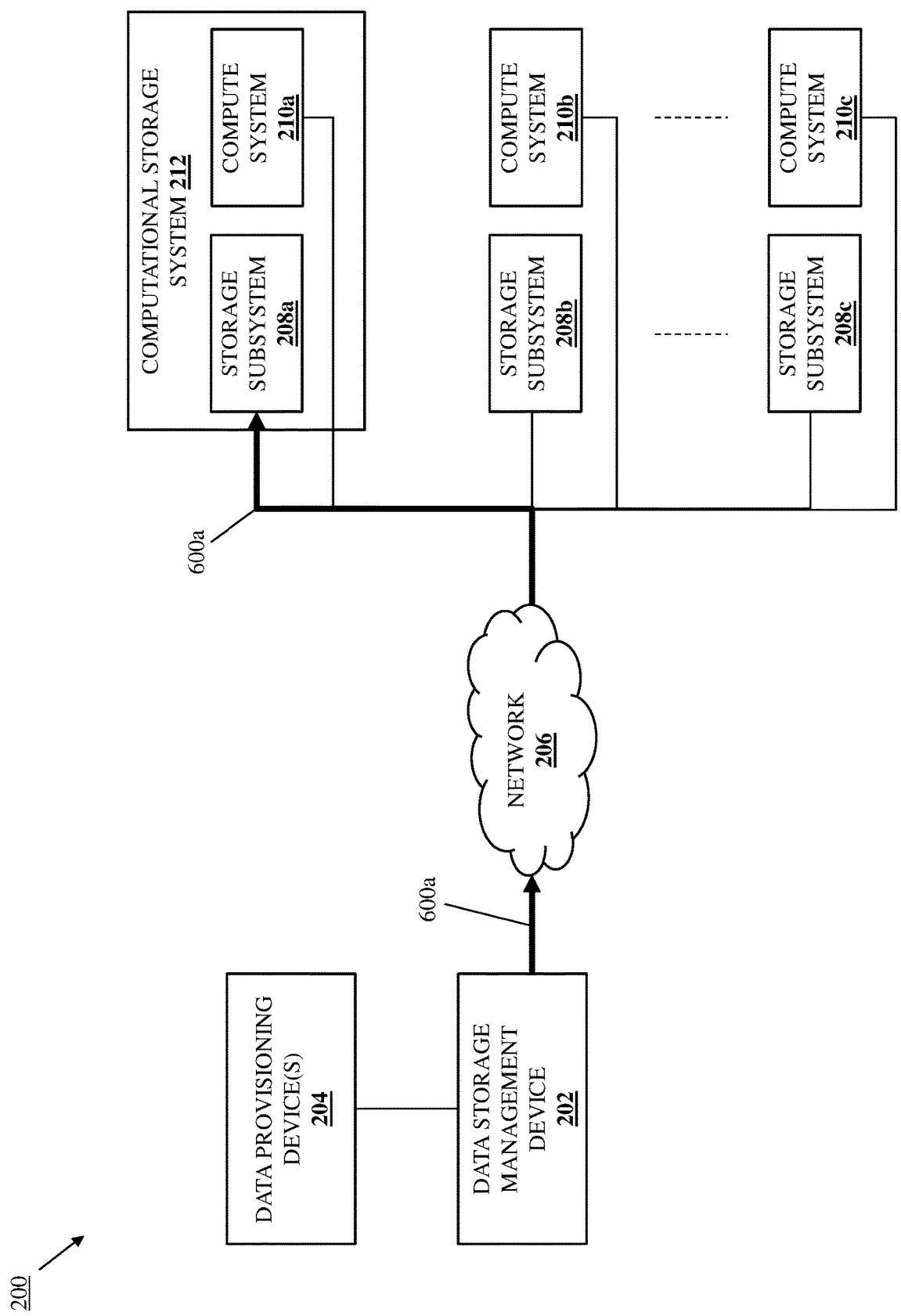
FIG. 6B is a schematic view illustrating an embodiment of the networked system of FIG. 2 operating during the method of FIG. 4.

The method 400 then proceeds to block 418 where the data storage management device transmits the data to the storage subsystem for storage. With reference to FIG. 6A, in an embodiment of block 418, the data storage management engine 304 in the data storage management device 202/300 may perform data storage transmission operations 600 that include transmitted the data received at block 402 (and in some embodiments transformed to the optimal data format at block 410) via its communication system 308 for storage in the storage system. For example, FIG. 6B illustrates how, at block 416, the storage subsystem 208a may have been identified as having the optimal storage subsystem type determined at block 412 and as being proximate the compute system 210a having the compute system type determined at block 414, and thus the data storage transmission operations 600 may include data storage transmission operations 600a that transmit the data via the network 206 and to the storage subsystem 208a for storage and processing by the compute system 210a.

Figure 6C:
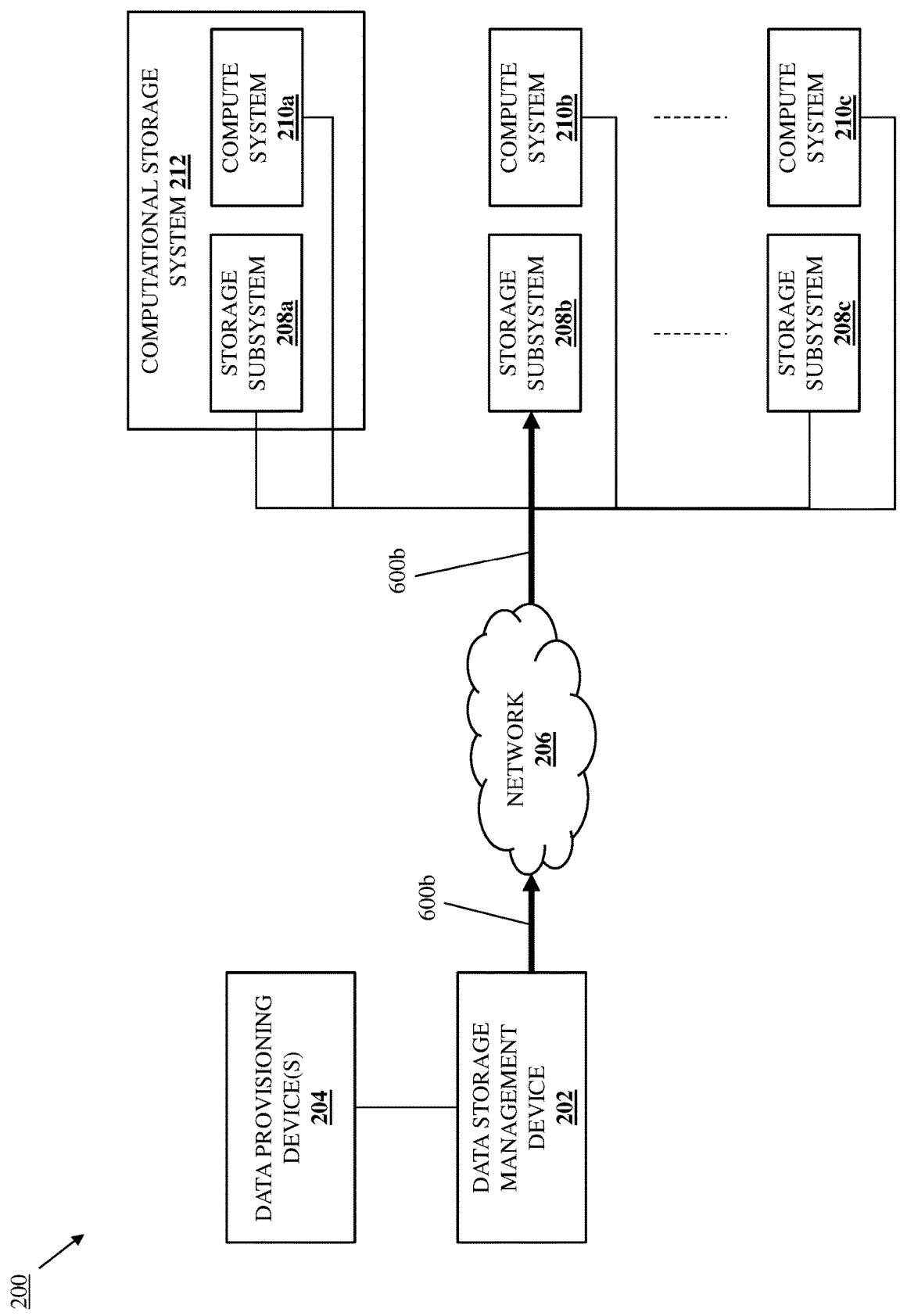
FIG. 6C is a schematic view illustrating an embodiment of the networked system of FIG. 2 operating during the method of FIG. 4.
Figure 6D:
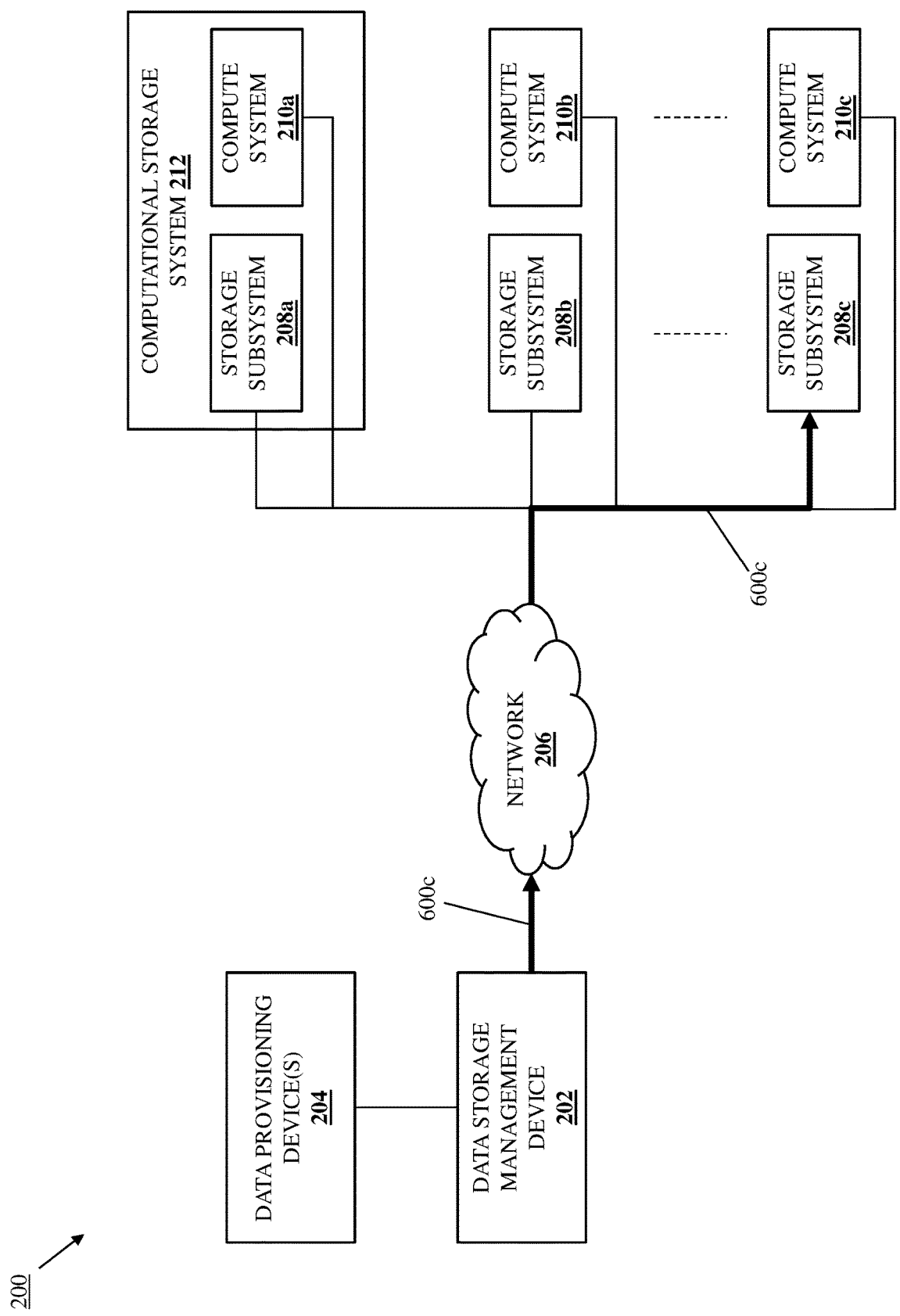
FIG. 6D is a schematic view illustrating an embodiment of the networked system of FIG. 2 operating during the method of FIG. 4.

In another example, FIG. 6C illustrates how, at block 416, the storage subsystem 208b may have been identified as having the optimal storage subsystem type determined at block 412 and as being proximate the compute system 210b having the compute system type determined at block 414, and thus the data storage transmission operations 600 may include data storage transmission operations 600b that transmit the data via the network 206 and to the storage subsystem 208b for storage and processing by the compute system 210b. In yet another example, FIG. 6D illustrates how, at block 416, the storage subsystem 208c may have been identified as having the optimal storage subsystem type determined at block 412 and as being proximate the compute system 210c having the compute system type determined at block 414, and thus the data storage transmission operations 600 may include data storage transmission operations 600c that transmit the data via the network 206 and to the storage subsystem 208c for storage and processing by the compute system 210c.

The method 400 then returns to block 402. As such, data received from the data provisioning device(s) may be "ingested" in the storage system for storage in the optimal available storage subsystem for the most efficient processing by the compute system(s) 210a-210c. As will be appreciated by one of skill in the art in possession of the present disclosure, the data stored in the storage system as part of the method 400 may be processed by the compute systems 210a-210c to generate "new" data included in "new" datasets that are part of "new" data streams, and the method 400 may be performed on that "new" data in order to store that "new" data in the optimal available storage subsystem in the storage system for the most efficient processing by the compute system(s) 210a-210c similarly as described above.

Furthermore, the learning sub-engine 304f in the infrastructure orchestrator 304d of the data storage management engine 304 may be configured to track, record, and/or otherwise monitor the storage of data having particular data formats, data types, and/or other data characteristics in the storage subsystems 208a-208c, as well as the processing of that data by the compute systems 210a-210c, for use in Artificial Intelligence/Machine Learning models and/or training in order to refine the data type predictions, processing operation predictions, optimal data format predictions, optimal storage subsystem type determinations, optimal compute system type determinations, and/or storage subsystem/compute system proximity identifications discussed above. As such, the storage of data having particular data formats, data types, and/or other data characteristics in the storage subsystems 208a-208c, as well as the processing of that data by the compute systems 210a-210c, according to the method 400 may be analyzed and used to retrain Artificial Intelligence/Machine Learning models used in the method 400, particularly when the predictions and/or determinations discussed above turn out to be incorrect.

For example, the learning sub-engine 304f in the infrastructure orchestrator 304d of the data storage management engine 304 may be configured to receive telemetry data from both an infrastructure layer (e.g., from the storage subsystems 208a-208c, the compute systems 210a-210c, as well as networking systems and/or other infrastructure systems that would be apparent to one of skill in the art in possession of the present disclosure), as well as a workload layer (e.g., including workloads for which the processing operations are performed by the compute systems 210a-210c on the data stored in the storage subsystems 208a-208c). The learning engine 304f may then use that telemetry data to determine the data types of the data (e.g., the dataset types of datasets) that are being stored, the resources (e.g., processing, networking, etc.) that are being used with that data, the workload processes, data types (e.g., dataset types), and "new" data (e.g., "new" datasets) that are being generated, as well as any other information that would be apparent to one of skill in the art in possession of the present disclosure.

The learning sub-engine 304f in the infrastructure orchestrator 304d of the data storage management engine 304 may then use the telemetry data discussed above to train the Artificial Intelligence/Machine Learning models that provide for the data type predictions, processing operation predictions, optimal data format predictions, optimal storage subsystem type determinations, optimal compute system type determinations, and/or storage subsystem/compute system proximity identifications discussed above for any received data, dataset, and/or data stream. Furthermore, those trained Artificial Intelligence/Machine Learning models and their associated features may then be stored (e.g., in a feature store database and model registry in the data storage management database 306), and when a request associated with received data is received from the resource allocation sub-engine 304e in the infrastructure orchestrator 304d of the data storage management engine 304, the learning sub-engine 304f may use the trained Artificial Intelligence/Machine Learning models to perform the data type predictions, processing operation predictions, optimal data format predictions, optimal storage subsystem type determinations, optimal compute system type determinations, and/or storage subsystem/compute system proximity identifications discussed above. In the event prediction/determination accuracy falls below a threshold level, or in the event new resources are added to the infrastructure, the Artificial Intelligence/Machine Learning models may be updated/retrained using any newly generated telemetry data, user provided metadata, and/or other data sources.

Thus, systems and methods have been described that determine a second data format for performing processing operation(s) on first format data that has a first data format and that is provided for storage, and then transform the first format data to second format data that includes the second data format before storing the data on a storage system. For example, the data storage placement system may include a data storage management device that is coupled to a data provisioning device and a storage system. The data storage management device receives first format data that includes a first data format from the data provisioning device, and predicts at least one processing operation that will be performed on the first format data. The data storage management device then determines a second data format for performing the at least one processing operation, and transforms the first format data to second format data that includes the second data format. The data storage management device then transmits the second format data for storage in the storage system. As such, data provided for storage in a storage system may be transformed to a data format for performing processing operations on that data prior to storing that data, eliminating the need to transform that data as part of the processing operations.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A data storage transformation system, comprising:
   a data provisioning device;
   a storage system including a plurality of storage subsystems;
   a plurality of compute systems; and
   a data storage management device that is coupled to the data provisioning device, the storage system, and the plurality of compute systems, wherein the data storage management device is configured to:
   receive, from the data provisioning device, first format data that includes a first data format;
   predict at least one processing operation that will be performed on the first format data;
   determine a second data format for performing the at least one processing operation;
   transform the first format data to second format data that includes the second data format;
   identify a first compute system from the plurality of compute systems that includes an optimal compute system type for performing the at least one processing operation relative to the other compute systems in the plurality of compute systems;

identify a first storage subsystem from the plurality of storage subsystems that includes an optimal storage subsystem type for performing the at least one processing operation relative to the other storage subsystems in the plurality of storage subsystems, and that is proximate the first compute system based on a geographical distribution of the plurality of storage subsystems and the plurality of compute subsystems; and transmit the second format data for storage in the first storage subsystem.

2. The system of claim 1, wherein the data storage management device is configured to:
predict a data type of the first format data; and
predict, based on the data type, the at least one processing operation that will be performed on the first format data.

3. The system of claim 2, wherein the data is one of a video data type, an audio data type, a text data type, an image data type, and a time-series data type.

4. The system of claim 1, wherein the data storage management device is configured to:
generate metadata for the second format data that identifies the data type; and
associate the metadata with the second format data.

5. The system of claim 1, wherein the data storage management device is configured to:
perform a graph analysis on a geographically-distributed resource topology to identify the geographical distribution of the plurality of storage subsystems and the plurality of compute systems.

6. The system of claim 1, wherein the data storage management device is configured to:
determine that the second data format is more optimal for performing the at least one processing operation using the first compute system than the first data format.

7. An Information Handling System (IHS), comprising:
a processing system; and
a memory system that is coupled to the processing system and that includes instructions that, when executed by the processing system, cause the processing system to provide a data storage management engine that is configured to:
receive, from a data provisioning device that is coupled to the processing system, first format data that includes a first data format;
predict at least one processing operation that will be performed on the first format data;
determine a second data format for performing the at least one processing operation;
transform the first format data to second format data that includes the second data format;
identify a first compute system, from a plurality of compute systems that are coupled to the processing system, that includes an optimal compute system type for performing the at least one processing operation relative to the other compute systems in the plurality of compute systems;
identify a first storage subsystem, from the plurality of storage subsystems that are coupled to the processing system, that includes an optimal storage subsystem type for performing the at least one processing operation relative to the other storage subsystems in the plurality of storage subsystems, and that is proximate the first compute system based on a geographical distribution of the plurality of storage subsystems and the plurality of compute subsystems; and transmit the second format data for storage in the first storage subsystem.

8. The IHS of claim 7, wherein the data storage management engine is configured to:
predict a data type of the first format data; and
predict, based on the data type, the at least one processing operation that will be performed on the first format data.

9. The IHS of claim 8, wherein the data is one of a video data type, an audio data type, a text data type, an image data type, and a time-series data type.

10. The IHS of claim 7, wherein the data storage management engine is configured to:
generate metadata for the second format data that identifies the data type; and
associate the metadata with the second format data.

11. The IHS of claim 7, wherein the data storage management engine is configured to:
perform a graph analysis on a geographically-distributed resource topology to identify the geographical distribution of the plurality of storage subsystems and the plurality of compute systems.

12. The IHS of claim 11, wherein the data storage management engine is configured to:
determine that the second data format is more optimal for performing the at least one processing operation using the first compute system than the first data format.

13. The IHS of claim 7, wherein the data storage management engine is configured to:
determine the second data format for performing the at least one processing operation based on an Artificial Intelligence (AI) inference model;
monitor telemetry data associated with the processing of the second format data stored in the first storage subsystem; and
modify the AI inference model based on the telemetry data.

14. A method for transforming data for storage, comprising:
receiving, by a data storage management device from a data provisioning device, first format data that includes a first data format;
predicting, by the data storage management device, at least one processing operation that will be performed on the first format data;
determining, by the data storage management device, a second data format for performing the at least one processing operation;
transforming, by the data storage management device, the first format data to second format data that includes the second data format;
identifying, by the data storage management device, a first compute system from a plurality of compute systems that includes an optimal compute system type for performing the at least one processing operation relative to the other compute systems in the plurality of compute systems;
identifying, by the data storage management device, a first storage subsystem from a plurality of storage subsystems that includes an optimal storage subsystem type for performing the at least one processing operation relative to the other storage subsystems in the plurality of storage subsystems, and that is proximate the first compute system based on a geographical distribution of the plurality of storage subsystems and the plurality of compute subsystems; and transmitting, by the data storage management device, the second format data for storage in the first storage subsystem.

15. The method of claim 14, further comprising:
predicting, by the data storage management device, a data type of the first format data; and
predicting, by the data storage management device based on the data type, the at least one processing operation that will be performed on the first format data.

16. The method of claim 15, wherein the data is one of a video data type, an audio data type, a text data type, an image data type, and a time-series data type.

17. The method of claim 14, further comprising:
generating, by the data storage management device, metadata for the second format data that identifies the data type; and
associating, by the data storage management device, the metadata with the second format data.

18. The method of claim 14, further comprising:
performing, by the data storage management device, a graph analysis on a geographically-distributed resource topology to identify the geographical distribution of the plurality of storage subsystems and the plurality of compute systems.

19. The method of claim 18, further comprising:
determining, by the data storage management device, that the second data format is more optimal for performing the at least one processing operation using the first compute system than the first data format.

20. The method of claim 14, further comprising:
determining, by the data storage management device, the second data format for performing the at least one processing operation based on an Artificial Intelligence (AI) inference model;
monitoring, by the data storage management device, telemetry data associated with the processing of the second format data stored in the first storage subsystem; and
modifying, by the data storage management device, the AI inference model based on the telemetry data.

* * * * *

UNITED STATES PATENT AND TRADEMARK OFFICE
CERTIFICATE OF CORRECTION

| | |
|---|---|
| PATENT NO. | : 12,072,906 B2 |
| APPLICATION NO. | : 18/078131 |
| DATED | : August 27, 2024 |
| INVENTOR(S) | : Cardente et al. |

It is certified that error appears in the above-identified patent and that said Letters Patent is hereby corrected as shown below:

In the Specification

Column 6, Lines 39-40, "a resource allocation sub-engine 304c" should read --a resource allocation sub-engine 304e--

Column 9, Line 37, "The resource allocation sub-engine 304c" should read --The resource allocation sub-engine 304e--

Column 10, Lines 17-18, "the resource allocation sub-engine 304c" should read --the resource allocation sub-engine 304e--

Column 10, Lines 19-20, "The resource allocation sub-engine 304c" should read --The resource allocation sub-engine 304e--

Column 12, Line 38, "The resource allocation sub-engine 304c" should read --The resource allocation sub-engine 304e--

Column 13, Lines 46-47, "the resource allocation sub-engine 304c" should read --the resource allocation sub-engine 304e--

Signed and Sealed this
Twelfth Day of November, 2024

Katherine Kelly Vidal
*Director of the United States Patent and Trademark Office*